No. 716,185. Patented Dec. 16, 1902.
R. A. BROWN & T. W. LIVINGSTON.
COTTON PLANTER.
(Application filed Sept. 25, 1902.)

(No Model.)

Witnesses
R. H. Storm.
J. H. Newman.

Inventors
Robert A. Brown
and Thomas W. Livingston
By E. E. Masson
Attorney

UNITED STATES PATENT OFFICE.

ROBERT A. BROWN AND THOMAS W. LIVINGSTON, OF LESLIE, GEORGIA.

COTTON-PLANTER.

SPECIFICATION forming part of Letters Patent No. 716,185, dated December 16, 1902.

Application filed September 25, 1902. Serial No. 124,847. (No model.)

*To all whom it may concern:*

Be it known that we, ROBERT A. BROWN and THOMAS W. LIVINGSTON, citizens of the United States, residing at Leslie, in the county of Sumter and State of Georgia, have invented certain new and useful Improvements in Cotton-Planters, of which the following is a specification.

The objects of this invention are to provide a simple, inexpensive, and reliable planter to drop the seed at any desired distance apart in rows, cotton-seed presenting difficulties on account of its fuzzy surface; but this planter is also adapted to drop other seeds. We attain these and other objects by the construction illustrated in the accompanying drawings, forming a part hereof, and wherein—

Figure 1:
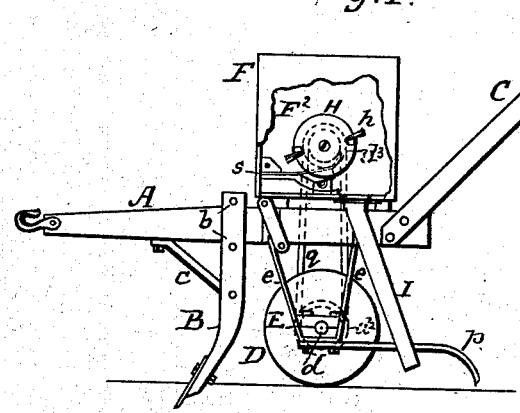
Figure 2:
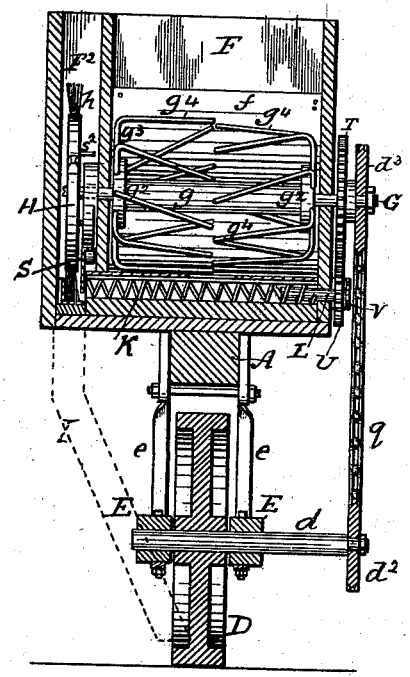
Figure 4:
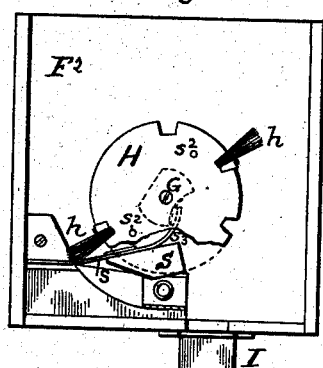
Figure 3:
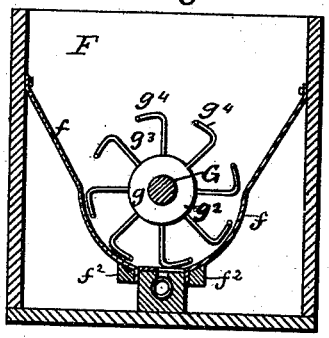
Figure 5:
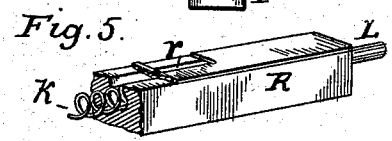
Figure 6:
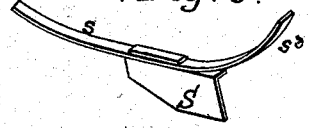

Figure 1 is a side view of a cotton-planter constructed in accordance with our invention, the side of the seedbox being broken away to show the seed wiping or brush wheel and the spring-gate. Fig. 2 is a transverse vertical section of the same, taken through the center of the seedbox. Fig. 3 is a longitudinal vertical section through the seedbox, its hopper, and seed-wiping wheel, and wire conveyer. Fig. 4 is a side view of the chamber containing the seed wiping or brush wheel with the side wall of said chamber removed. Fig. 5 is a perspective view of a portion of the conveyer-casing with a portion of the wire conveyer projecting therefrom. Fig. 6 is a perspective view of the spring-gate of the device.

In said drawings, A represents the plow-beam of the planter, to which the upper end of the plow-stock B is secured at $b$. The latter is also retained by a forward brace $c$, having its upper end secured to the beam A. The rear end of said beam is provided with a pair of handles C, as usual.

The rear portion of the beam A is carried by a ground-wheel D, the axle $d$ of which is received in journal-boxes E, secured to the lower ends of the divergent braces $e$, the upper ends of which are secured to the sides of the beam A. On the top of the beam is secured the seedbox F, within which is secured the sheet-metal hopper $f$, the bottom of which is substantially semicylindrical. Through the sides of the seedbox passes a shaft G, upon which is secured a spool-like hub $g$, having disks $g^2$ on its ends. From each of said disks radially project a series of flexible fingers or wires $g^3$, the upper ends of which are bent horizontally and slightly rearwardly as sweeps at $g^4$ to not only stir the seed in a circle, but to sweep it toward the slot-like discharge-opening $r$ in the top plate of the seed-conveyer casing R. Upon the shaft G there is also mounted a disk H, having a series of radial brushes $h$ to advance the seed toward the outlet-pipe I. Said disk is located in a narrow or discharge chamber $F^2$ alongside of the feed-chamber or seedbox F and having the general contour of said box, but with its bottom on a slightly-lower level than the bottom of the hopper $f$.

To direct and advance the seed from the hopper $f$ laterally into the bottom of the chamber $F^2$, a conveyer consisting of a wire K, bent spirally, is placed horizontally in a cylindrical cavity of the conveyer-casing R. To prevent the cotton-seed from being pulled by the wiping-brushes $h$ from the end of said casing R, we provide a gate S, which is normally maintained in a plane above the outlet end of the conveyer-casing by a spring-support $s$, but is adapted to be lowered to close said outlet through the instrumentality of pins or studs $s^2$, projecting from the body of the seed wiper or brush wheel H at points in advance of the brushes or wipers $h$, said pins coöperating with the upwardly-curved forward portion $s^3$ of the spring-support, and thereby each discharge contains the same number of seeds. The distance apart between each dropping of seed is regulated by the number of seed-wipers $h$ placed around the periphery of the disk H. The descent of the gate and the advance of the wipers momentarily closes the outlet of the conveyer-casing and directs the previously-ejected seed into the flaring upper end of the outlet-pipe I, from which it drops upon the ground and is covered by the spring-bar $p$, which is extended to the rear of the outlet-pipe.

The conveyer-casing R is preferably of such form, as illustrated in Fig. 5, that it can be readily inserted and withdrawn from the bottom of the seed box or receptacle. This provision renders the conveyer easy of access for repairing or cleaning purposes and also enables us to employ wire coils of different sizes and pitch to adapt the planter to various kinds of seed. As shown in Fig. 3, the conveyer-casing is located between the supports $f^2$, which sustain the sides of the sheet-metal hopper $f$, and its top plate constitutes a portion of the bottom of said hopper.

To rotate the upper or main shaft G and also the wire conveyer K, there may be mounted upon one end of the axle $d$ of the ground-wheel a sprocket-wheel $d^2$, and upon the protruding end of the shaft G a sprocket-wheel $d^3$, said sprocket-wheels being operatively connected by a chain $q$. The shaft G is also provided with a gear-wheel T, which meshes with a gear-wheel U, fast on the axle or carrier L, that serves to carry and rotate the wire conveyer K. In the present illustration the upper gear-wheel T is a relatively large gear-wheel and its companion gear-wheel U is a relatively small wheel. These gear-wheels, however, are interchangeable, and it is obvious that the arrangement may be reversed, according as the conveyer is desired to feed fast or slow, and which will depend more or less on the nature of the seed that is being planted. In order to guide the sprocket-chain $q$ and to prevent the same from coming in contact with the lower gear-wheel U, a guard V may be employed, as illustrated in Fig. 2.

It will be obvious to those skilled in the art to which the invention relates that modifications may be made in details without departing from the spirit and scope of the invention. Hence we do not limit ourselves to the precise construction and arrangement of parts hereinbefore described, and illustrated in the accompanying drawings; but, Having described the nature and objects of our invention, what we claim as new, and desire to secure by Letters Patent, is—

1. In a seed-planter, the combination of a double-chambered seedbox, whereof one of the chambers is provided with a seed stirring and feeding hopper having a discharge-opening at its bottom, and whereof the other chamber is provided with a revoluble seed-wiping device and with a complemental outlet, a casing underlying and communicating with said hopper and relatively movable in respect thereto, a spirally-bent wire arranged to be rotated in said casing for conveying the seed to said second-mentioned chamber, a spring-supported gate disposed at the outlet end of the conveyer-casing, and pins projecting from said seed-wiping device for intermittently closing said gate, substantially as described.

2. In a seed-planter, the combination of a support, a seedbox having a seed stirring and feeding hopper, a detachable conveyer-casing into which said hopper discharges, a conveyer in said casing consisting of a spirally-bent wire, and a support for said conveyer whereby it may be rotated, substantially as described.

3. In a seed-planter, the combination of a support, a seedbox divided into a relatively large feeding-chamber and a narrow discharge-chamber having a complemental outlet, said chambers arranged side by side, a hopper mounted in said first-mentioned chamber and having a discharge-opening at its bottom, a shaft penetrating both chambers, flexible fingers mounted on the shaft within the hopper and acting to stir the seed in a circle and to sweep the same toward the discharge-opening, a conveyer and its casing arranged below said hopper for advancing the seed to said narrow discharge-chamber, and means, substantially as described, for rotating said shaft and conveyer.

4. In a seed-planter, the combination of a plow-beam, a plow-stock secured thereto, a ground-wheel under said beam, a double-chambered seedbox upon said stock, a shaft penetrating both chambers, two series of flexible fingers mounted on the shaft within one of the chambers and acting to stir the seed in a circle and to feed the same, a disk mounted on the shaft in the other chamber and having seed-wipers on its periphery, a conveyer-casing communicating with both of said chambers, a conveyer in said casing, a spring-supported gate for said casing, means for intermittently closing same, means for imparting motion to said shaft and conveyer from the axle of the ground-wheel, and means for covering the seeds as they are ejected from the machine, substantially as described.

In testimony whereof we affix our signatures in presence of two witnesses.

ROBERT A. BROWN.
THOMAS W. LIVINGSTON.

Witnesses:
E. L. WILSON,
J. L. BRADLEY.